US006231753B1

(12) United States Patent
McKnight et al.

(10) Patent No.: US 6,231,753 B1
(45) Date of Patent: May 15, 2001

(54) TWO STAGE DEEP NAPHTHA DESULFURIZATION WITH REDUCED MERCAPTAN FORMATION

(75) Inventors: Craig A. McKnight, Sherwood Park (CA); Thomas R. Halbert, Baton Rouge, LA (US); John P. Greeley; Garland B. Brignac, both of Clinton, NJ (US); Richard A. Demmin, Highland Park, NJ (US); William E. Winter, Jr., Baton Rouge, LA (US); Bruce R. Cook, Stewartsville, NJ (US)

(73) Assignee: Exxon Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/448,961

(22) Filed: Nov. 24, 1999

Related U.S. Application Data

(63) Continuation-in-part of application No. 08/583,725, filed on Feb. 2, 1996, now Pat. No. 6,126,814.

(51) Int. Cl.$^7$ .................................................. C10G 45/104
(52) U.S. Cl. .......................... 208/217; 208/220; 208/210; 208/217; 208/216 R
(58) Field of Search .................................... 208/251, 215, 208/217

(56) References Cited

U.S. PATENT DOCUMENTS

| 4,149,965 | * | 4/1979 | Pine et al. | 208/216 |
| 4,243,519 | * | 1/1981 | Shorfheide | 208/210 |
| 5,423,975 | | 6/1995 | Sudhakar et al. | 208/216 R |
| 5,525,211 | | 6/1996 | Sudhakar et al. | 208/217 |
| 5,906,730 | * | 5/1999 | Hatnaka et al. | 208/210 |
| 5,985,136 | * | 11/1999 | Brignac et al. | 208/210 |

* cited by examiner

Primary Examiner—Helane Myers
(74) Attorney, Agent, or Firm—Henry E. Naylor; Gerard J. Hughes

(57) ABSTRACT

Selective and deep desulfurization of a high sulfur content mogas naphtha, with reduced product mercaptans and olefin loss, is achieved by a two stage, vapor phase hydrodesulfurization process with interstage separation of at least 80 vol. % of the $H_2S$ formed in the first stage from the first stage, partially desulfurized naphtha vapor effluent fed into the second stage. At least 70 wt. % of the sulfur is removed in the first stage and at least 80 wt. % of the remaining sulfur is removed in the second stage, to achieve a total at least 95 wt. % feed desulfurization, with no more than a 60 vol. % feed olefin loss. The second stage temperature and space velocity are preferably greater than in the first. The hydrodesulfurization catalyst preferably contains a low metal loading of Co and Mo metal catalytic components on an alumina support.

18 Claims, No Drawings

TWO STAGE DEEP NAPHTHA DESULFURIZATION WITH REDUCED MERCAPTAN FORMATION

CROSS-REFERENCE TO RELATED APPLICATION

This application is a continuation-in-part application of U.S. patent application Ser. No. 08/583,725 filed on Feb. 2, 1996 now U.S. Pat. No. 6,126,814, which was refiled as a Continuing Prosecution Application on Feb. 28, 1998.

Background of the Invention

1. Field of the Invention

The invention relates to a two stage naphtha desulfurization process with reduced mercaptan formation. More particularly, the invention relates to a two stage, vapor phase naphtha hydrodesulfurization process with interstage $H_2S$ removal, wherein the second stage temperature and space velocity is greater than the first, for deep, selective sulfur removal with reduced olefin loss and mercaptan formation.

2. Background of the Invention

Future mogas sulfur specifications are being regulated through legislation to increasingly lower levels, due to environmental considerations. Sulfur specifications on the order of less than 150 wppm of total sulfur are likely near term, with values of no greater than 30 wppm of total sulfur possible in the not too distant future. Such sulfur specifications are without precedent and will require the production of low sulfur blend stock for the mogas pool. The primary sulfur sources in the mogas pool are the blend stocks derived from FCC naphthas, whose sulfur content can fall in the range of 100–7000 wppm depending upon crude quality and FCC operation. Conventional fixed bed hydrodesulfurization can reduce the sulfur level of FCC naphthas to very low levels, but the severe conditions of temperature, pressure and treat gas ratio results in significant octane loss, due to extensive loss of olefins by saturation. Selective one and two-stage hydrodesulfurization processes have been developed to avoid massive olefin saturation and octane loss. Such processes are disclosed, for example, in U.S. Pat. Nos. 4,149,965; 4,243,519; 5,525,211; 5,423,975, and 5,906,730. However, some of these processes, including two-stage processes, aren't suitable for use with high (e.g., >1000 wppm) levels of feed sulfur. Further, in these and in other processes, in the hydrodesulfurization reactor the liberated $H_2S$ reacts with the retained olefins, to form mercaptan sulfur compounds. These mercaptans are formed as a consequence of the $H_2S$ formed during the hydrodesulfurization process and are known as reversion mercaptans. The amount of these mercaptans formed during the process typically exceeds future fuel specifications for mercaptan sulfur and, in some cases, total sulfur. Accordingly, a selective naphtha desulfurization process is needed for reducing the total sulfur level, particularly for high sulfur content naphtha feeds, with minimal mercaptan reversion, while retaining a high level of feed olefins.

SUMMARY OF THE INVENTION

The invention relates to a two-stage, vapor phase naphtha hydrodesulfurization process with interstage $H_2S$ removal, wherein most of the sulfur is removed in the first stage and wherein the percent desulfurization, temperature and space velocity are greater in the second stage than in the first. The process selectively removes sulfur, with reduced mercaptan formation, from a naphtha feed containing olefins and organic sulfur compounds. The process comprises (i) passing a sulfur and olefin-containing naphtha feed and hydrogen into a first vapor reaction stage in which the feed reacts with the hydrogen, in the presence of a hydrodesulfurization catalyst, to remove most of the sulfur from the feed and produce an effluent comprising a mixture of reduced sulfur naphtha and $H_2S$, (ii) separating the reduced sulfur naphtha and $H_2S$, (iii) passing hydrogen and the reduced sulfur naphtha into a second vapor reaction stage, in which the percent desulfurization is greater than that in the first stage and in which naphtha reacts with the hydrogen, in the presence of a hydrodesulfurization catalyst, to remove most of the remaining sulfur in the naphtha and form an effluent comprising a mixture of $H_2S$ and a desulfurized naphtha product and (iv) separating the naphtha product from the $H_2S$. The second stage reaction temperature is preferably higher than that in the first stage. Both reaction stages are vapor reaction stages, for increased selectivity of the hydrodesulfurization reaction for sulfur removal. The process is useful for deep and selective sulfur removal, with reduced olefin loss and mercaptan formation, particularly with a high sulfur content naphtha feed. By high feed sulfur content is meant from 0.1–0.7 wt. % (1000–7000 wppm) of sulfur in the form of organic sulfur bearing compounds. At least 80, preferably at least 90 and more preferably at least 95 vol. % of the $H_2S$ formed in the first stage is separated from the first stage sulfur reduced naphtha, before it is passed into the second stage. The second stage effluent comprises a desulfurized product naphtha having less than 5 and preferably less than 2 wt. % of the feed sulfur, with at least a 40 vol. % feed olefin retention. The desulfurization reaction conditions are adjusted to achieve respective desulfurizations of at least 70 and 80 wt. % in the first and second stages and preferably respective desulfurizations of at least 80 and 90 wt. %. The reaction conditions include respective temperatures, pressures, treat gas ratios and space velocities broadly ranging from 450–800° F., 60–600 psig., 2000–4000 scf/b and 1–10 v/v/hr. Interstage $H_2S$ separation and removal may be achieved by any suitable means, such as cooling the first stage vapor effluent to condense the naphtha, separating the condensed naphtha liquid from the remaining gas, which contains most of the $H_2S$, followed by stripping the separated naphtha, if necessary. Amine scrubbing may also be used to remove any remaining $H_2S$ in the naphtha. The hydrodesulfurization catalyst can be any catalyst known to be useful for hydrodesulfurization. Such catalysts typically comprise at least one catalytically active metal component of a metal from Group VIII and more typically at least one from both Group VIII and Group VI, preferably Group VIB, on a suitable catalyst support, with non-noble Group VIII metals preferred. Low catalytic metal loadings of less than 12 wt. %, based on the weight of the catalytic metal oxide, are preferred. Particularly preferred is a low metal loaded catalyst comprising CoO and $MoO_3$ on a support, in which the Co/Mo atomic ratio ranges from 0.1 to 1.0, as is explained in detail below. The hydrodesulfurization catalyst in each stage may be the same or different, and may be fresh or partially spent. The catalyst may be presulfided or it may be sulfided in-situ, using conventional sulfiding procedures.

DETAILED DESCRIPTION

It is anticipated that environmentally driven regulatory pressure on motor gasoline (mogas) sulfur levels, will result in the widespread production of 150 ppm total sulfur mogas by the year 2000 and 30 wppm or less, perhaps shortly thereafter. Further, gas oil and other feeds for a fluid cat cracker used to produce cat cracked naphthas, are increasingly using ever more amounts of poorer quality, high sulfur content components, due to the dwindling supply of higher quality crude oil sources. This results in higher sulfur contents in the cat cracked naphthas, which are the major source of naphtha stocks for mogas pools. Thus, the reduction in mercaptan reversion achieved by the two stage, selective hydrodesulfurizing process of the invention, is important with respect to the desulfurized product meeting both low total sulfur and mercaptan sulfur specifications, while preserving the olefins valuable for octane. At such deep levels of desulfurization of from 90–100 wt. % feed sulfur removal, particularly with relatively high sulfur content naphtha feeds (e.g., >1000–7000 wppm sulfur), the contribution of sulfur from reversion mercaptans to the total sulfur, can be significant. Therefore, the control of mercaptan formation is necessary to reach these very low sulfur levels of $\leq 150$ wppm, especially $\leq 30$ wppm.

In the process of the invention, both reaction stages are vapor reaction stages, in which the naphtha is present as vapor, to increase selectivity of the hydrodesulfurization catalyst and reaction for sulfur removal, with reduced olefin loss by saturation, to maximize feed olefin retention in the desulfurized naphtha product. The naphtha fed into each stage will be mostly, and preferably all vapor. Preferably the naphtha feed for both stages is all vapor. Any naphtha in the liquid state vaporizes during the hot, exothermic hydrodesulfurization reaction and the hydrodesulfurized naphtha effluent from each stage is all vapor, and this is what is meant by "vapor reaction stage". The amount of reaction hydrogen fed into each stage is greater than the amount consumed by the reaction. The effluent from both stages comprises a mixture of $H_2S$, naphtha vapor, unreacted hydrogen and minor amounts of hydrocarbons boiling below the naphtha range, produced during the reaction. Most of the sulfur present in the naphtha feed is removed in the first stage, with most of the remaining sulfur removed in the second stage. By this is meant that at least 70 and preferably at least 80 wt. % of the feed sulfur is removed from the naphtha in the first stage. Similarly, at least 80, preferably at least 90 and more preferably at least 95 wt. % of the remaining sulfur is removed in the second stage. Even though the amount of sulfur removed from the naphtha in the first stage is greater than that removed in the second stage, the percent or extent of desulfurization is greater in the second stage than in the first. The sulfur is removed as $H_2S$ formed by the hydrodesulfurization reactions. More than 95 wt. % of the feed sulfur is removed by the process of the invention, to produce a desulfurized, second stage naphtha product having less than 50 wppm, preferably less than 40 wppm, and more preferably less than 30 wppm of sulfur in the form of organic sulfur compounds, of which up to 100 wt. % may comprise mercaptan sulfur. Further, at least 40, preferably at least 45, and more preferably at least 50 vol. % of the amount of olefins present in the feed is retained.

Fresh hydrogen may be fed (i) into both stages, (ii) into only the second stage, with the hydrogen-rich gaseous second stage effluent, with or without $H_2S$ removal, passed back into the first stage to supply the first stage reaction hydrogen, or (iii) into only the first stage, with the hydrogen-rich gaseous first stage effluent, after $H_2S$ removal, passed into the second stage to supply the second stage reaction hydrogen. It is preferred that the fresh hydrogen be introduced into the second stage under option (ii) above and more preferred that it be introduced into both stages. The fresh hydrogen can be all hydrogen or be in the form of a hydrogen treat gas comprising at least 60 and preferably at least 80 vol. % hydrogen, with the remainder inert material such as nitrogen, methane and like. It may also includes at least a portion of reaction hydrogen effluent, after clean up to remove $H_2S$. The actual amount of hydrogen used is in excess of the amount needed for one or both stages, depending on whether it is for one or both stages. In the embodiment in which all of the hydrodesulfurization hydrogen is introduced into the second stage, the second stage gas effluent will contain less than 0.5, preferably less than 0.1 and more preferably less than 0.05 vol. % $H_2S$. In laboratory experiments, less than 0.03 vol. % $H_2S$ was present in the second stage, hydrogen-rich gaseous effluent. Thus, in the embodiment (iii) above, after condensing the second stage vapor effluent to recover and separate the desulfufrized naphtha product. The remaining hydrogen-rich gas may be recycled back into the first stage without prior sulfur ($H_2S$) removal, due to the extremely low sulfur levels in the gas, achieved in the process of the invention.

The ranges for the temperature, pressure and treat gas ratio employed in the process of the invention are somewhat narrower than those employed in the prior art, generally. The Table below illustrates the broad and preferred ranges of temperature, pressure and treat gas ratio of the process of the invention, in comparison with typical prior art ranges.

| | The Invention | | |
|---|---|---|---|
| Conditions | Broad | Preferred | Prior Art |
| Temp., ° F. | 450–750 | 500–650 | 400–700 |
| Total Press., psig. | 60–600 | 100–400 | 100–2000 |
| Treat gas ratio, scf/b | 1000–4000 | 2000–4000 | 200–10000 |

The second stage reaction temperature will be at least 20 and preferably at least 50° F. higher than that in the first stage. While the LHSV in each stage may range from 1–10 v/v/h, the second stage LHSV is preferably at least 1.5, more preferably at 2 to 5 and most preferably 2 to 3 times greater than that in the first stage. The preferred operating conditions improve the selectivity of this process, by favoring hydrodesulfurization with less olefin saturation (octane loss).

The organic sulfur compounds in a typical naphtha feed to be desulfurized, comprise mercaptan sulfur compounds (RSH), sulfides (RSR), disulfides (RSSR), thiophenes and other cyclic sulfur compounds, and aromatic single and condensed ring compounds. Mercaptans present in the naphtha feed typically have from one to three ($C_1$–$C_3$) carbon atoms. During the hydrodesulfurization process, the mercaptans in the feed are removed by reacting with the hydrogen and forming $H_2S$ and paraffins. It is believed that the $H_2S$ produced in the reactor from the removal of the organic sulfur compounds, reacts with the olefins to form new mercaptans (reversion mercaptans). Generally it has been found that the mercaptans present in the hydrodesulfurized product have a higher carbon number than those found in the feed. These reversion mercaptans formed in the reactor, and which are present in the desulfurized product, typically comprise $C_{4+}$ mercaptans. Others have proposed reducing the mercaptan and/or total sulfur of the hydrodesulfurized naphtha product by means such as 1) pretreating the feed to saturate diolefins, 2) extractive sweetening of the hydrotreated product, and 3) product sweetening with an oxidant, alkaline base and catalyst. However, diolefin saturation requires an additional reactor vessel and has not been demonstrated as effective for reducing RSH formation. The higher carbon number mercaptans produced by the reversion reactions are difficult to extract into caustic. The third approach suggests sweetening the product by producing disulfides from the mercaptans, and therefore has no value in reducing the total sulfur, as does the process of the invention.

Naphtha feeds or feedstocks useful in the process of the invention include petroleum naphthas, steam cracked naphthas, coker naphthas, FCC naphthas and blends and fractions thereof, with end boiling points typically below 450° F., and which typically contain 60 vol. % or less olefinic hydrocarbons, with sulfur levels as high as 3000 wppm and even higher (e.g., 7000 wppm). The naphtha feed, preferably a cracked naphtha feedstock, generally contains not only paraffins, naphthenes and aromatics, but also unsaturates, such as open-chain and cyclic olefins, dienes and cyclic hydrocarbons with olefinic side chains. A cracked naphtha feed generally has an overall olefins concentration ranging as high as about 60 vol. %. The olefin content of a typical cracked naphtha feed can broadly range from 5–60 vol. %, but more typically from 10–40 vol. %. In the practice of the invention, it is preferred that the olefin concentration in the fresh naphtha feed be at least 15 vol. % and preferably range between 25–60+vol. %. The diene concentration can be as much as 15 wt. %, but more typically ranges from about 0.2 wt. % to about 5 wt. % of the feed. High diene concentrations can result in a gasoline product with poor stability and color. The sulfur content of a naphtha feed can range from as low as 0.05 wt. %, up to as much as about 0.7 wt. %, based on the total feed composition. However, for a cat cracked naphtha and other high sulfur content naphthas useful as feeds in the selective desulfurization process of the invention, the sulfur content may broadly range from 0.1 to 0.7 wt. %, more typically from about 0.15 wt. % to about 0.7 wt. %, with 0.2–0.7 wt. % and even 0.3–0.7 wt. % being preferred. The nitrogen content will generally range from about 5 wppm to about 500 wppm, and more typically from about 20 wppm to about 200 wppm.

The hydrodesulfurization catalyst will comprise a Group VIII non-noble metal component, such as Co, Ni and Fe, in combination with a component of at least one metal selected from Group VI, IA, IIA, IB metals and mixture thereof, supported on any suitable, high surface area inorganic metal oxide support material such as, but not limited to, alumina, silica, titania, magnesia, silica-alumina, and the like. Alumina, silica and silica-alumina are preferred. A catalyst comprising a component of at least one metal of Group VIII and at least one metal of Group VIB on a suitable catalyst support is preferred. Preferred Group VIII metals include Co and Ni, with preferred Group VIB metals comprising Mo and W. All Groups of the Periodic Table referred to herein mean Groups as found in the Sargent-Welch Periodic Table of the Elements, copyrighted in 1968 by the Sargent-Welch Scientific Company. Metal concentrations are typically those existing in conventional hydroprocessing catalysts and can range from about 1–30 wt % of the metal oxide, and more typically from about 10–25 wt. % of the oxide of the catalytic metal components, based on the total catalyst weight. As mentioned above, the catalyst may be presulfided or sulfided in-situ, by well known and conventional methods.

A low metal loaded hydrodesulfirization catalyst comprising CoO and $MoO_3$ on a support in which the Co/Mo atomic ratio ranges from 0.1 to 1.0 is particularly preferred. By low metal loaded is meant that the catalyst will contain not more than 12, preferably not more than 10 and more preferably not more than 8 wt. % catalytic metal components calculated as their oxides, based on the total catalyst weight. Such catalysts include: (a) a $MoO_3$ concentration of about 1 to 10 wt. %, preferably 2 to 8 wt. % and more preferably 4 to 6 wt. % of the total catalyst; (b) a CoO concentration of 0.1 to 5 wt. %, preferably 0.5 to 4 wt. % and more preferably 1 to 3 wt. % based on the total catalyst weight. The catalyst will also have (i) a Co/Mo atomic ratio of 0.1 to 1.0, preferably 0.20 to 0.80 and more preferably 0.25 to 0.72; (ii) a median pore diameter of 60 to 200, preferably from 75 to 175 and more preferably 80 to 150; (iii) a $MoO_3$ surface concentration of $0.5 \times 10^{-4}$ to $3 \times 10^{-4}$ g. $MoO_3/m^2$, preferably $0.75 \times 10^{-4}$ to $2.4 \times 10^{-4}$ and more preferably $1 \times 10^{-4}$ to $2 \times 10^{-4}$ and (iv) an average particle size diameter of less than 2.0 mm, preferably less than 1.6 mm and more preferably less than 1.4 mm. The most preferred catalysts will also have a high degree of metal sulfide edge plane area as measured by the Oxygen Chemisorption Test described in "Structure and Properties of Molybdenum Sulfide: Correlation of $O_2$ Chemisorption with Hydrodesulfurization Activity", S. J. Tauster, et al., J of Catalysis, 63, p. 515–519 (1980), which is incorporated herein by reference. The Oxygen Chemisorption Test involves edge-plane area measurements made wherein pulses of oxygen are added to a carrier gas stream and thus rapidly traverse the catalyst bed. Thus, the metal sulfide edge plane area will be from about 761 to 2800, preferably from 1000 to 2200, and more preferably from 1200 to 2000 μmol oxygen/gram $MoO_3$, as measured by oxygen chemisorption. Alumina is a preferred support. The alumina supported catalyst used in all of the Examples below, met at least the broad ranges of all of the preferred catalyst parameters set forth above in this paragraph. For catalysts with a high degree of metal sulfide edge plane area, magnesia can also be used. The catalyst support material will preferably contain less than 1 wt. % of contaminants such as Fe, sulfates, silica and various metal oxides which can be present during preparation of the catalyst. It is preferred that the catalyst be free of such contaminants. In one embodiment, the catalyst may also contain from up to 5 wt. %, preferably 0.5 to 4 wt. % and more preferably 1 to 3 wt. % of an additive in the support, which additive is selected from the group consisting of phosphorous and metals or metal oxides of metals of Group IA (alkali metals).

The one or more catalytic metals can be deposited incorporated upon the support by any suitable conventional means, such as by impregnation employing heat-decomposable salts of the Group VIB and VIII metals or other methods known to those skilled in the art, such as ion-exchange, with impregnation methods being preferred. Suitable aqueous impregnation solutions include, but are not limited to a nitrate, ammoniated oxide, formate, acetate and the like. Impregnation of the catalytic metal hydrogenating components can be employed by incipient wetness, impregnation from aqueous or organic media, compositing. Impregnation as in incipient wetness, with or without drying and calcining after each impregnation is typically used. Calcination is generally achieved in air at temperatures of from 500–1200° F., with temperatures from 800–1100° F. typical.

The invention will be further understood with reference to the examples below.

EXAMPLES

Comparative Example

A commercially prepared batch of a high dispersion (Co—Mo)/$Al_{2O3}$ hydrodesulfurization catalyst consisting of 4.34 wt. % $MoO_3$ and 1.19 wt. % CoO on the alumina support was used. The catalyst was a 1.3 mm asymmetric quadralobe size and 125 cc was loaded into an isothermal, all vapor-phase, downflow pilot plant reactor. All vapor phase conditions were chosen to maximize selectivity for desulfurization over olefin hydrogenation. The feed was a commercial, intermediate cat cracked naphtha boiling between 150 and 370° F. and had a total of 3340 wppm of sulfur, 0 wppm mercaptan sulfur, and a Bromine Number of 50.7 cg/g, representing 32.8 vol. % feed olefins. The hydrodesulfurization conditions in the reactor were 525° F., a 100% hydrogen treat gas ratio of 2000 scf/b, an inlet pressure of 225 psig and a liquid hourly space velocity (LHSV) of 1.15 hr$^{-1}$ (v/v/hr). The reactor effluent was cooled to ambient to condense the treated naphtha product, which was separated from a remaining gas phase comprising $H_2S$ and unreacted $H_2$, and then stripped to remove any dissolved $H_2S$ from the product. In a single stage, the total sulfur and olefin contents of the desulfurized product, after stripping, were 34 wppm and a Bromine Number of 14.9 cg/g, which corresponds to 9.6 vol. % olefins. Thus, total desulfurization in this single stage process was over 99%, with a 71% olefin loss.

Example 1

This experiment was identical to Comparative Example A, in using the same feed, catalyst (100 cc) and reactor. With the exception of the space velocity, which was 2.6 hr$^{-1}$, the reaction conditions and hydrogen treat gas and ratio were the same. After cooling, condensation, separation and stripping to remove $H_2S$ as in Comparative Example A, the desulfurized naphtha product had a total sulfur content of 395 wppm, a reversion mercaptan content of 93.2 wppm and a Bromine Number of 37.7 cg/g. Thus 88 wt. % sulfur removal was achieved in the first stage of the process, with the first stage naphtha having an olefin content of 24.3 vol. %, representing a 25.9% first stage olefin loss. This represented the first stage of a two stage process of the invention. The stripped liquid product was the feed to the second stage.

The stripped product was then fed into the same reactor, but at a much higher space velocity, for the second stage hydrodesulfurization. The reactor conditions were 525° F., a 100% hydrogen treat gas at a rate of 2000 scf/b, and a space velocity of 5.8 hr$^{-1}$. Thus, the 5.8 hr$^{-1}$ space velocity was more than twice that for the first stage. After cooling, separation from the $H_2S$ and unreacted $H_2$, and stripping, the desulfurized naphtha product liquid was found to have a total sulfur content of 25 wppm, a reversion mercaptan sulfur content of 11.5 wppm and a Bromine No. of 32.3 cg/g, which represents 20.8 vol. % olefins in the desulfurized, second stage naphtha product liquid. This represents a total feed desulfurization of 99+ wt. % and an olefin loss of 36 vol. %.

Example 2

Ist Stage Preparation of Feed for Second Stage

This experiment was identical to Example A, in using the same feed, catalyst (175 cc) and reactor conditions. With the exception of the space velocity, which was varied between 1.6 and 2.0 hr$^{-1}$, the reaction conditions and hydrogen treat gas and ratio were the same. After cooling, condensation, separation and stripping to remove $H_2S$ as in Comparative Example A, the desulfurized product had a total sulfur content of 331 wppm, a reversion mercaptan content of 79 wppm and a Bromine Number of 37.9 cg/g. Thus, 90.1 wt. % sulfur removal was achieved in the first stage of the process, with the first stage naphtha effluent having an olefin content of 23.1 vol. %, representing a 25.3% olefin loss. This represented the first stage of a two stage process according to the practice of the invention. The first stage stripped naphtha product liquid was the feed to the second stage.

$2^{nd}$ Stage Processing

The stripped naphtha product was then fed into another reactor (40 cc of catalyst) at a higher temperature and at a higher liquid hourly space velocity. The reactor conditions were 575° F., a 100% hydrogen treat gas rate of 3000 scf/b and a space velocity of 3.2 hr$^{-1}$. Thus, the second stage reaction temperature was 50° F. higher than the first stage and the space velocity was about twice that for the first stage. After cooling, separation from the $H_2S$ and unreacted $H_2$, and stripping, the desulfurized naphtha product was found to have a total sulfur content of 30 wppm, a reversion mercaptan sulfur content of 2.1 wppm and a Bromine Number of 30.8 cg/g. This represents a total feed desulfurization of 99.1 wt. % and an olefin loss of 39.3 vol. % versus Comparative Example A which, at 99% HDS, saturated 71% of the olefins.

Run Numbers 1 Through 8

A number of hydrodesulfirization runs were made with a wide variety of feeds, using a wide variety of temperatures, pressures, feed rates and hydrogen treat rates and the same low metals loaded, preferred catalyst used in the examples above The data obtained from these tests was used to construct a model allowing calculation of the sulfur and olefin content of the first and second stage naphtha effluents. Examples 5–10 are based on these calculations.

Comparative Example B (Run# 1)

In this comparative example, a single stage was used for the naphtha feed desulfurization at reactor conditions of 525° F., 225 psig. inlet pressure and an all-hydrogen treat gas rate of 2000 scf/b. The liquid hourly space velocity (LHSV) was 1.2 hr$^{hu\ -1}$ (v/v/hr). The reactor effluent was cooled to condense the naphtha, which was then separated from the remaining gas and stripped to remove essentially all of the $H_2S$ from the naphtha condensate. The sulfur content of the stripped naphtha was 34 wppm and the Bromine Number was 14.9 cg/g which corresponds to 9.6 vol. % retained olefins. Thus, the total % HDS (hydrodesulfurization) of the feed naphtha was 99 wt. %, with a 29 vol. % of retained olefins. The results of this Run # 1 are summarized with those of Example 3 in Table 1.

Example 3 (Run #2)

Two reaction stages are used in this example. The second stage temperature was 575° F., which is 50° F. higher than that in the first. The space velocities were 3.36 hr$^{-1}$ in the first stage and 7.07 hr$^{-1}$ in the second stage, with essentially all the $H_2S$ removed from the first stage effluent, before feeding it to the second stage. After stripping, the second stage naphtha had a sulfur content of 33.5 wppm, with a Bromine Number of 33, which represents 65 vol. % retained olefins. The results for this run are also set forth in Table 1, to compare this two-stage process of the invention example with the single stage process in which the fresh naphtha was desulfurized down to the same low level.

TABLE 1

| | Run # | | | | | |
|---|---|---|---|---|---|---|
| | 1 | | | 2 | | |
| | Process | | | | | |
| | Single Stage Hydrodesulfurization | | | Two Stage Hydrodesulfurization | | |
| | Stage | | | Stage | | |
| Rx Conditions | First | Second | Product | First | Second | Product |
| Temp., °F. | 525 | | | 525 | 575 | |
| LHSV, v/v/hr | 1.2 | | | 3.36 | 7.07 | |
| Feed Props. | | | | | | |
| S, wppm | 3340 | | 36.9 | 3340 | 669 | 33.5 |
| Bromine #. | 50.7 | | 15.6 | 50.7 | 42.3 | 33 |
| Results | | | | | | |
| % HDS per stage | 98.9 | | | 80 | 95 | |
| % retained olefins | 30.8 | | | 83 | 78 | |
| Total % HDS | | | 99 | | | 99 |
| Total % olefins | | | 29 | | | 65 |

Comparing the results for the two different runs, the single stage Run 1 process and the two stage process of the invention, Run 2, it is immediately apparent that the two stage process of the invention was able to achieve the same high feed desulfurization level of 33.5 wppm of sulfur (99 wt. % of feed sulfur removal), while retaining a high level of 65 vol. % of the valuable feed olefins, compared to a significantly lower olefin retention level of only 29 vol. % for the single stage process.

Examples 4 and 5 (Run#'s 3 and 4)

In these examples, the effect of varying the temperature in the second stage reactor is observed, while maintaining all other conditions constant. The same feed, catalyst, first stage temperature, hydrogen treat rate, and pressure as used above in runs 1 and 2 are also used in the two runs of this example. The results are set forth in Table 2 below, where they are compared with those of Run 2 (Example 3).

TABLE 2

| | Run # | | | | | | | | |
|---|---|---|---|---|---|---|---|---|---|
| | 2 Stage | | | 3 Stage | | | 4 Stage | | |
| | First | Second | Product | First | Second | Product | First | Second | Product |
| Rx Conditions | | | | | | | | | |
| Temp., °F. | 525 | 575 | | 525 | 525 | | 525 | 625 | |
| LHSV, v/v/hr | 3.36 | 7.07 | | 3.38 | 2.11 | | 3.38 | 19.46 | |
| Feed Props. | | | | | | | | | |
| S, wppm | 3340 | 669 | 33.5 | 3340 | 669 | 33.5 | 3340 | 669 | 33.5 |
| Bromine #. | 50.7 | 42.3 | 33 | 50.7 | 42.3 | 31.2 | 50.7 | 42.3 | 33.9 |
| Results | | | | | | | | | |
| % HDS | 80 | 95 | | 80 | 95 | | 80 | 95 | |
| % retained olefins per stage | 83 | 78 | | 83 | 74 | | 83 | 80 | |
| Total % HDS | | | 99 | | | 99 | | | 99 |
| Total % olefins | | | 65 | | | 62 | | | 67 |

Thus, at a total feed desulfurization of 99 wt. % sulfur yielding a total product sulfur content of 33.5 wppm in each run, there are more retained olefins in the desulfurized product when the temperature in the second reactor is higher than that in the first reactor. In Run 3 in which the second stage temperature is the same as the first stage, the desulfurized naphtha product contains 62 vol. % retained olefins. On the other hand, 65 and 67 vol. % olefins are respectively retained in Runs 2 and 4, in which the second stage operates at a higher temperature than the first. Further, the relatively low space velocity of only 2.11 required in the second stage of Run 3, to achieve the 99 wt. % desulfurization level, means that the second stage reactor will have to be bigger than the first stage reactor. In marked contrast, the higher space velocities in runs 2 and 4 mean that the second stage reactor will be smaller than the first, and therefore less costly. This is emphasized in Run 4, in which the second stage space velocity is 19.46 with a second stage temperature of 625° F.

Examples 6 and 7 (Runs 5 and 6)

In these examples, the % HDS in each stage was varied by changing the space velocity, as shown in Table 3. In each case, the first stage temperature is 525° F. and the second stage temperature is 575° F., and the total desulfurization is 99 wt. %. As in Table 2, Run 2 was used as a comparative bench mark. The same feed, catalyst, hydrogen treat rate of 2000 scf/b, and pressure of 225 psig, used above in the examples above, are also used in the runs of these examples. The results are set forth in Table 3 below, where they are compared with those of Run 2 (Example 3).

TABLE 3

| | Run # | | | | | | | | |
|---|---|---|---|---|---|---|---|---|---|
| | 2 Stage | | | 5 Stage | | | 6 Stage | | |
| | First | Second | Product | First | Second | Product | First | Second | Product |
| Rx Conditions | | | | | | | | | |
| Temp., °F. | 525 | 575 | | 525 | 575 | | 525 | 575 | |
| LHSV, v/v/hr | 3.36 | 7.07 | | 1.4 | 13.15 | | 2.08 | 9.46 | |
| Feed | | | | | | | | | |

TABLE 3-continued

| | Run # | | | | | | | | |
|---|---|---|---|---|---|---|---|---|---|
| | 2 Stage | | | 5 Stage | | | 6 Stage | | |
| | First | Second | Product | First | Second | Product | First | Second | Product |
| Props. | | | | | | | | | |
| S, wppm | 3340 | 669 | 33.5 | 3340 | 169 | 33.7 | 3340 | 335 | 33.5 |
| Bromine #. | 50.7 | 42.3 | 33 | 50.7 | 32.8 | 28.7 | 50.7 | 37.8 | 31.3 |
| Results | | | | | | | | | |
| % HDS per stage | 80 | 95 | | 95 | 80 | | 90 | 90 | |
| % retained olefins | 83 | 78 | | 65 | 66 | | 75 | 83 | |
| Total % HDS | | | 99 | | | 99 | | | 99 |
| Total % olefins | | | 65 | | | 57 | | | 62 |

The loss of retained feed olefins in Runs 5 and 6 compared to Run 2 in Table 3 and to Run 4 in Table 2, demonstrates the superior benefits of operating the second stage reactor at a greater % HDS and at a temperature higher than that in the first stage.

Examples 8 and 9 (Runs 7 and 8)

In these experiments, the amount of $H_2S$ removed from the first stage effluent is varied at less than 100 wt. %, so that the partially desulfurized first stage naphtha entering the second stage contains two different levels of sulfur, as shown in Table 4. Run 2 is again included in Table 4 for comparative purposes. In each case, the first stage temperature is 525° F. and the second stage temperature is 575° F., and the total desulfurization is substantially 99 wt. %. The same feed, catalyst, hydrogen treat rate of 2000 scf/b, and pressure of 225 psig, used above in the examples above, are also used in the runs of these examples. The effect on the total desulfurization, of the amount of $H_2S$ in the second stage feed, is shown in Table 4.

TABLE 4

| | Run # | | | | | | | | |
|---|---|---|---|---|---|---|---|---|---|
| | 2 Stage | | | 7 Stage | | | 8 Stage | | |
| | First | Second | Product | First | Second | Product | First | Second | Product |
| Rx Conditions | | | | | | | | | |
| Temp., ° F. | 525 | 575 | | 525 | 575 | | 525 | 575 | |
| LHSV, v/v/hr | 3.36 | 7.07 | | 1.4 | 13.15 | | 2.08 | 9.46 | |
| % 1st stage $H_2S$ removal | 100 | | | 90 | | | 75 | | |
| Feed Props. | | | | | | | | | |
| S, wppm | 3340 | 669 | 33.5 | 3340 | 669 | 37.1 | 3340 | 669 | 43 |
| Results | | | | | | | | | |
| % HDS per stage | 80 | 95 | | 80 | 94.5 | | 80 | 93.6 | |
| Total % HDS | | | 99.0 | | | 98.9 | | | 98.7 |

The amount of product sulfur in the product of Run 7 is 37.1 or 3.6 wppm greater than that for Run 2, this represents a 10.7 wt. % increase in sulfur compared to the base case Run 2. At these very low sulfur levels, this is a significant increase. The desulfurized product naphtha of Run 8 is 28.3 wt. % higher than that of the base case Run 2. While the olefin retention is not shown, those skilled in the art will understand and appreciate that reversion mercaptan formation during the second stage hydrodesulfurization will increase with increasing amounts of $H_2S$ in the naphtha feed passed into the second stage.

This thus demonstrates the benefit of removing the $H_2S$ from the first stage naphtha effluent, before it is passed into the second stage.

Example 10

This experiment was identical to that in Example 2, in using the same feed, catalyst (125 cc), catalyst age, reactor and all vapor phase operation. With the exception of the hydrogen treat gas, which contained 0.5 vol. % $H_2S$ and a space velocity of 1.15, the reaction conditions and treat gas ratio were the same. After cooling, condensation, separation and stripping to remove $H_2S$, the desulfurized naphtha product liquid had a total sulfur content of 215 wppm, a reversion mercaptan content of 132.3 wppm, and a Bromine number of 30.4 cg/g, which corresponds to 19.6 vol. % olefins. Thus, compared to Example 2 above, the net effect of using a relatively high $H_2S$ concentration in the hydrogen treat gas in the first stage is to increase the reversion mercaptan content. However, these reversion mercaptans are readily removed in the second stage of the process. This thus demonstrates that the unreacted hydrogen from the second stage can be fed back into the first stage and also, that other $H_2S$-containing hydrogen streams from other sources can be used to furnish hydrogen to the first stage, without the need for prior costly clean-up to remove the $H_2S$ first.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof, by those skilled in the art to which the invention pertains.

What is claimed is:

1. A two-stage, vapor phase naphtha hydrodesulfurization process comprising (i) passing a sulfur and olefin-containing naphtha feed and hydrogen into a first vapor reaction stage in which said feed reacts with said hydrogen, in the presence of a bydrodesulfurization catalyst, to remove most of said sulfur from said feed to produce an effluent comprising a mixture of reduced sulfur naphtha and $H_2S$, (ii) separating said reduced sufur naphtha and $H_2S$, (iii) passing hydrogen and said reduced sulfur naphtha into a second vapor reaction stage, in which the reaction temperature and percent desulfurization are greater than that in said first stage, wherein said sulfur reduced naphtha reacts with said hydrogen, in the presence of a hydrodesulfurization catalyst, to remove most of the remaining sulfur in said naphtha to form an effluent comprising a mixture of $H_2S$ and a desulfurized naphtha product which contains $H_2S$, (iv) removing said $H_2S$ from said second stage liquid naphtha to form a desulfurized naphtha product liquid having at least about 40 vol. % of the olefin in the feed, and (v) removing said $H_2S$ from said desulfurized naphtha product liquid.

2. A process according to claim 1 wherein said hydrodesulfurization reaction conditions comprise a temperature of from 450–750° F., a pressure of from 60–600 psig., a treat gas ratio of from 1000–4000 scf/b and a space velocity of from 1–10 v/v/hr.

3. A process according to claim 2 wherein said naphtha feed contains at least 1000 wppm sulfur.

4. A process according to claim 3 wherein said naphtha product contains less than 5 wt. % of said feed sulfur.

5. A process according to claim 4 wherein at least than 80 vol. % of said $H_2S$ produced in the first stage is separated from said first stage sulfur reduced naphtha, before said sulfur reduced naphtha is passed into said second stage.

6. A process according to claim 5 wherein said hydrodesulfurization catalyst is the same or different in said two stages and comprises at catalytic metal component of a metal from Group VIII and Group VIB.

7. A process according to claim 6 wherein said product naphtha contains less than 50 wppm sulfur.

8. A process according to claim 7 wherein the space velocity of the naphtha in said second is greater than that in said first stage.

9. A process according to claim 8 wherein at least than 90 vol. % of said first stage $H_2S$ is separated from said first stage sulfur reduced naphtha, before said sulfur reduced naphtha is passed into said second stage and at least 50 vol. % of the olefin content of said feed naphtha is retained in said product naphtha.

10. A process according to claim 9 wherein said catalytic metal components comprise a component of Co and of Mo.

11. A process according to claim 10 wherein at least 80 and 90 wt. % desulfurization is achieved in said first and second stages, respectively.

12. A process according to claim 11 wherein said feed sulfur content is in the range of from 1000 to 7000 wppm sulfur and wherein said feed olefin content is in the range of from 15 to at least 60 vol. %.

13. A process according to claim 12 wherein said space velocity in said second stage is at least 1.5 times greater than that in said first stage.

14. A process according to claim 13 wherein said reaction conditions include a temperature of from 500–650° F., a pressure of from 100–400 psig., and a treat gas ratio of from 2000–4000 scf/b.

15. A two-stage, vapor phase reaction process for deep hydrodesulfurization of a naphtha feed containing at least 15 vol. % olefins and from 0.1 to 0.7 wt. % sulfur in the form of organic sulfur compounds, with reduced reversion mercaptan formation comprises:

(a) passing said feed and hydrogen into a first vapor phase reaction stage, in which said feed is in the vapor phase and reacts with said hydrogen in the presence of a hydrodesulfurizing catalyst, to remove at least 70 wt. % of said sulfur, to produce a first stage effluent comprising a partially desulfurized naphtha vapor and a gas comprising $H_2S$, unreacted hydrogen and lower boiling hydrocarbons;

(b) cooling said first stage effluent to condense said naphtha vapor to liquid which contains dissolved $H_2S$;

(c) separating said liquid naphtha from said $H_2S$-containing gas;

(d) removing $H_2S$ from said liquid naphtha to form a first stage naphtha reduced $H_2S$;

(e) passing said naphtha reduced in $H_2S$ formed in (d) and a hydrogen treat gas into a second vapor phase reaction stage, in which said naphtha reduced in $H_2S$ is in the vapor phase and reacts with said hydrogen in the presence of a hydrodesulfurization catalyst, to remove at least 80 wt. % of the remaining sulfur from said naphtha and form a desulfurized naphtha vapor and a gas comprising $H_2S$, unreacted hydrogen and lower boiling hydrocarbons, and wherein the temperature in said second stage is at least 20° F. greater than in said first stage, and wherein the space velocity in the second stage is at least 1.5 times greater than the space velocity in the first stage;

(f) cooling said second stage vapor effluent to condense said naphtha vapor to liquid which contains $H_2S$;

(g) separating said second stage liquid naphtha from said $H_2S$-containing gas; and (h) removing $H_2S$ from said second stage liquid naphtha to form a desulfurized naphtha product liquid which contains less than 5 wt. % of the amount of said sulfur present in said feed and at least 40 vol. % of the olefin content of said feed, wherein the catalyst in both stages comprising Co and Mo catalytic metal components on a support and present in said catalyst in an amount of less than a total of 12 wt. % calculated as the respective metal oxides CoO and $MoO_3$ and wherein the Co to Mo atomic ratio ranges from 0.1 to 1.0.

16. A process according to claim 15 wherein the reaction conditions in each stage range from 450–750° F., a pressure of from 60–600 psig., a treat gas ratio of from 1000–4000 scf/b and a space velocity of from 1–10 v/v/hr and wherein the percent desulfurization in said second stage is at least 90%.

17. A process according to claim 16 wherein no more than 10 vol. % of said $H_2S$ formed in said first stage is passed into said second stage.

18. A process according to claim 17 wherein the space velocity in said second stage is greater than that in said first stage.

* * * * *